(12) United States Patent
Smith et al.

(10) Patent No.: US 10,811,859 B2
(45) Date of Patent: *Oct. 20, 2020

(54) GROUNDING SYSTEM

(71) Applicant: Cambria County Association for the Blind and Handicapped, Johnstown, PA (US)

(72) Inventors: Allen Garrett Smith, Johnstown, PA (US); Gregory Stephen Platt, Windber, PA (US); Timothy Joseph Wedding, Johnstown, PA (US)

(73) Assignee: Cambria County Association For The Blind And Handicapped, Johnstown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/553,513

(22) Filed: Aug. 28, 2019

(65) Prior Publication Data
US 2019/0386475 A1     Dec. 19, 2019

Related U.S. Application Data

(63) Continuation of application No. 16/205,280, filed on Nov. 30, 2018, now Pat. No. 10,461,518, which is a continuation of application No. 15/725,668, filed on Oct. 5, 2017, now Pat. No. 10,177,551.

(51) Int. Cl.
| | | |
|---|---|---|
| H02G 7/22 | (2006.01) |
| H01R 4/34 | (2006.01) |
| H02G 7/05 | (2006.01) |
| H02S 20/20 | (2014.01) |
| H02S 20/00 | (2014.01) |
| H02S 30/00 | (2014.01) |
| H02S 40/36 | (2014.01) |
| H01R 11/12 | (2006.01) |
| H01R 11/26 | (2006.01) |
| H01R 4/42 | (2006.01) |
| H01R 4/64 | (2006.01) |

(52) U.S. Cl.
CPC ............. *H02G 7/22* (2013.01); *H01R 4/34* (2013.01); *H02G 7/053* (2013.01); *H02S 20/00* (2013.01); *H02S 20/20* (2014.12); *H02S 30/00* (2013.01); *H01R 4/42* (2013.01); *H01R 4/64* (2013.01); *H01R 11/12* (2013.01); *H01R 11/26* (2013.01); *H02S 40/36* (2014.12)

(58) Field of Classification Search
CPC ...................................................... H02G 7/22
See application file for complete search history.

(56) References Cited

U.S. PATENT DOCUMENTS

| | | | |
|---|---|---|---|
| 3,971,894 A | 7/1976 | Faust et al. | |
| 7,057,103 B1 | 6/2006 | Peabody | |
| 9,722,405 B2 | 8/2017 | Smith et al. | |
| 10,177,551 B1* | 1/2019 | Smith | H02G 7/053 |
| 10,461,518 B2* | 10/2019 | Smith | H02S 20/00 |
| 2012/0024563 A1 | 2/2012 | Korman et al. | |

(Continued)

*Primary Examiner* — Hung V Ngo
(74) *Attorney, Agent, or Firm* — Eckert Seamans Cherin & Mellott, LLC

(57) ABSTRACT

A grounding system, structured to ground a number of cables supported by a support assembly, includes a multi-function line assembly and a number of conductive mounting assemblies. Each conductive mounting assembly is structured to be coupled to the multi-function line and to a conductive pile.

13 Claims, 10 Drawing Sheets

(56) References Cited

U.S. PATENT DOCUMENTS

2013/0157500 A1 6/2013 Mattson et al.
2013/0244505 A1 9/2013 Hanson et al.
2014/0237774 A1 8/2014 Kline

* cited by examiner

GROUNDING SYSTEM

CROSS REFERENCE TO RELATED APPLICATION

This is a continuation application of and claims priority to U.S. patent application Ser. No. 16/205,280, filed Nov. 30, 2018, which application is a continuation application and claims priority to U.S. patent application Ser. No. 15/725,668, filed Oct. 5, 2017, now U.S. patent Ser. No. 10/177,551, issued Jan. 8, 2019, entitled GROUNDING SYSTEM.

BACKGROUND OF THE INVENTION

Field of the Invention

The disclosed and claimed concept relates to a grounding system for a suspended cable assembly and, more particularly, to a grounding system that includes conductive elements whereby grounding cables do not need to be spliced into a conductor wire disposed adjacent a messenger wire, and, to a system wherein a multi-function line provides support and a current path.

Background Information

In solar, mining, and electrical industries there is a need for electrical cables to extend from a power or signal source to a location of application. Such cables are usually indirectly connected and supported by a support assembly including a number of poles or piles (hereinafter, and collectively, "piles"), a messenger wire, and a number of cable hangers. That is, a number of piles provide elevated support points extending along a selected path. The "messenger wire" is, and as used herein, a robust cable structured to support a number of other wires (hereinafter, "supported wires") and which is not structured to carry a signal or power. The support assembly further includes a grounding conductor or a grounding conductor wire that is disposed adjacent the messenger wire and/or among the supported wires. The messenger wire is coupled to the piles at an elevated location. The number of cable hangers are then coupled to the messenger wire. The cable hangers are structured to support the supported wires such as, but not limited to, electrical and signal wires.

For example, solar plants comprise large arrays of solar panels spread out over a large area. The solar panels are supported by a racking assembly coupled to a pile or other support. The solar panels collect the sun's rays causing a current to flow to current wires that are attached to the solar panels. The current flows to other equipment (collectively, along with any equipment downstream of the solar panels, "solar electrical equipment"). For example, in one embodiment, the solar panels generate a direct current that is communicated to combiner boxes before being communicated to power inverters wherein the direct current is converted to alternating current. In another embodiment, each solar panel has a micro-inverter that converts the current to alternating current which is then communicated to other solar electrical equipment. Accordingly, as used herein, any conductor that carries current, direct or alternating, from a solar panel is, as used herein, a "current wire." Each current wire extends away from the associated solar panel and is grouped with a bundle of similar current wires from other solar panels. The bundle of current wires is supported by a series of cable hangers suspended from a messenger wire. The messenger wire is supported by a number of piles extending adjacent the solar panels or which support the solar panels.

While the messenger wire is not structured to carry a current, there are instances wherein the messenger wire does carry a current. For example, lightning is known to strike the messenger wires, the current wire(s), the solar electrical equipment, the support piles, or any other construct coupled to these elements. Further, a current wire, or any other wire carrying a current can fail creating a short or other undesirable current in the supported bundle of wires. This is why a conductor or grounding wire is disposed adjacent the messenger wires; hereinafter, such a wire is identified as a "grounding conductor." The grounding conductor must be coupled to a current path to the ground. Further, many regulations require that the grounding conductor be grounded at each pile. Presently, the grounding conductor is grounded by splicing a conductor, such as, but not limited to, a copper wire into the grounding conductor and coupling the copper wire to a grounding cable or, if the piles are conductive, to each pile. That is, the copper wire must be spliced into the grounding conductor, i.e., a "grounding splice," and, then electrically coupled to the pile or a ground cable. The process of installing the conductors, i.e., splicing the copper wire into the grounding conductor and making an electrical coupling with the pile is difficult, time consuming and expensive. These are problems of the known art.

There is, therefore, a need for a grounding system that is less expensive and which can be installed quickly and easily. There is a further need for the grounding system to be compatible with existing support assemblies.

SUMMARY OF THE INVENTION

These needs, and others, are met by at least one embodiment of the disclosed and claimed concept which provides a grounding system structured to ground a number of cables supported by a support assembly. The grounding system includes a multi-function line assembly and a number of conductive mounting assemblies. Each conductive mounting assembly is structured to be, and is, coupled to the multi-function line and to a conductive pile. This configuration provides a path to ground for a current in the multi-function line assembly. Further, the multi-function line supports the cable hangers (which support the current wires, data wires and other wires). That is, a single multi-function line supports the cable hangers, as a messenger wire, and provides a current path, as a grounding conductor. Accordingly, as used herein, a "multi-function line" means a tension member that supports current wires and/or cable hangers, and, which is conductive. That is, a messenger wire is not a "multi-function line." Similarly, a conductor that does not support other constructs is not a "multi-function line."

A grounding system in this configuration, and as discussed below, solves the problems noted above.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 2:
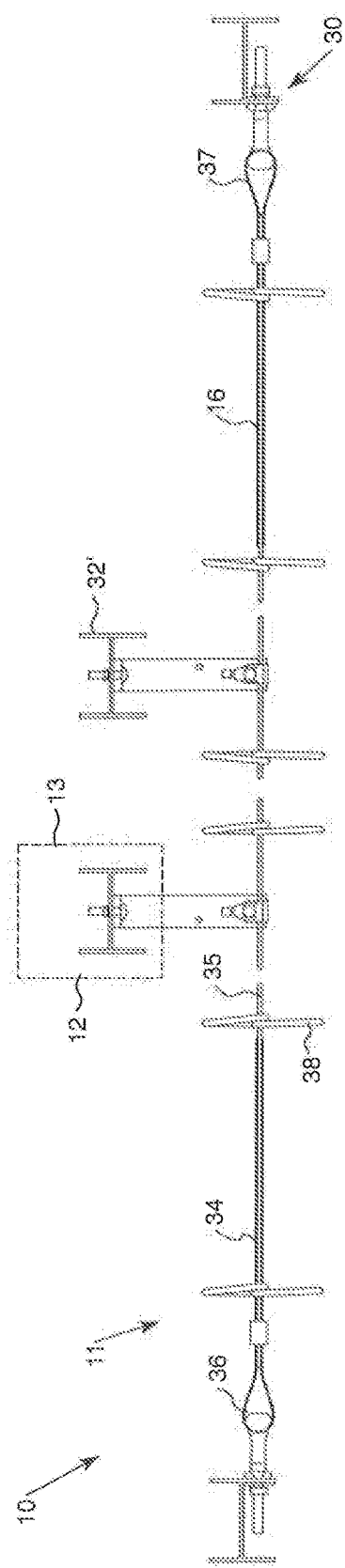
FIG. 2 is a schematic top view of an installation.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, and as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut.

As used herein, a "fastener" is a separate component structured to couple two or more elements. Thus, for example, a bolt is a "fastener" but a tongue-and-groove coupling is not a "fastener." That is, the tongue-and-groove elements are part of the elements being coupled and are not a separate component.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the phrase "removably coupled" or "temporarily coupled" means that one component is coupled with another component in an essentially temporary manner. That is, the two components are coupled in such a way that the joining or separation of the components is easy and would not damage the components. For example, two components secured to each other with a limited number of readily accessible fasteners, i.e., fasteners that are not difficult to access, are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, "temporarily disposed" means that a first element(s) or assembly (ies) is resting on a second element(s) or assembly(ies) in a manner that allows the first element/assembly to be moved without having to decouple or otherwise manipulate the first element. For example, a book simply resting on a table, i.e., the book is not glued or fastened to the table, is "temporarily disposed" on the table.

As used herein, "operatively coupled" means that a number of elements or assemblies, each of which is movable between a first position and a second position, or a first configuration and a second configuration, are coupled so that as the first element moves from one position/configuration to the other, the second element moves between positions/configurations as well. It is noted that a first element may be "operatively coupled" to another without the opposite being true.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours.

As used herein, a "path of travel" or "path," when used in association with an element that moves, includes the space an element moves through when in motion. As such, any element that moves inherently has a "path of travel" or "path." Further, a "path of travel" or "path" relates to a motion of one identifiable construct as a whole relative to another object. For example, assuming a perfectly smooth road, a rotating wheel (an identifiable construct) on an automobile generally does not move relative to the body (another object) of the automobile. That is, the wheel, as a whole, does not change its position relative to, for example, the adjacent fender. Thus, a rotating wheel does not have a "path of travel" or "path" relative to the body of the automobile. Conversely, the air inlet valve on that wheel (an identifiable construct) does have a "path of travel" or "path" relative to the body of the automobile. That is, while the wheel rotates and is in motion, the air inlet valve as a whole, moves relative to the body of the automobile.

As used herein, and with respect to electricity or a current, a current "path" means one, or a plurality of coupled conductive elements, that provide a route through which electricity travels.

As used herein, the statement that two or more parts or components "engage" one another means that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A either engages element B while in element A first position.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "coupled" to the screw. If an axial force is applied to the screwdriver, the screwdriver is pressed against the screw and "engages" the screw; however, when a rotational force is applied to the screwdriver, the screwdriver "operatively engages" the screw and causes the screw to rotate.

As used herein, "depending" means to extend at an angle other than zero (0°) from another element without regard to direction. That is, for example, a "depending" sidewall may extend generally upwardly from a base. Further, a "depending" sidewall inherently has a distal end.

As used herein, the word "unitary" means a component that is created as a single piece or unit. That is, a component that includes pieces that are created separately and then coupled together as a unit is not a "unitary" component or body.

As used herein, the term "number" shall mean one or an integer greater than one (i.e., a plurality). Thus, for example, a "number of elements" means one element or a plurality of elements.

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

As used herein, a "radial side/surface" for a circular or cylindrical body is a side/surface that extends about, or encircles, the center thereof or a height line passing through the center thereof. As used herein, an "axial side/surface" for a circular or cylindrical body is a side that extends in a plane extending generally perpendicular to a height line passing through the center. That is, generally, for a cylindrical soup can, the "radial side/surface" is the generally circular sidewall and the "axial side(s)/surface(s)" are the top and bottom of the soup can. Further, as used herein, a "radially extending surface" means a surface defined by a plane that extends generally along a radial line and/or a surface that is generally perpendicular to an axial surface.

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately," i.e., in an approximate range relevant to the measurement as would be understood by one of ordinary skill in the art.

As used herein, "generally curvilinear" includes elements having multiple curved portions, combinations of curved portions and planar portions, and a plurality of planar portions or segments disposed at angles relative to each other thereby forming a curve.

As used herein, "generally" means "in a general manner" relevant to the term being modified as would be understood by one of ordinary skill in the art.

As used herein, "substantially" means "for the most part" relevant to the term being modified as would be understood by one of ordinary skill in the art.

As used herein, "at" means on and/or near relevant to the term being modified as would be understood by one of ordinary skill in the art.

Figure 1:
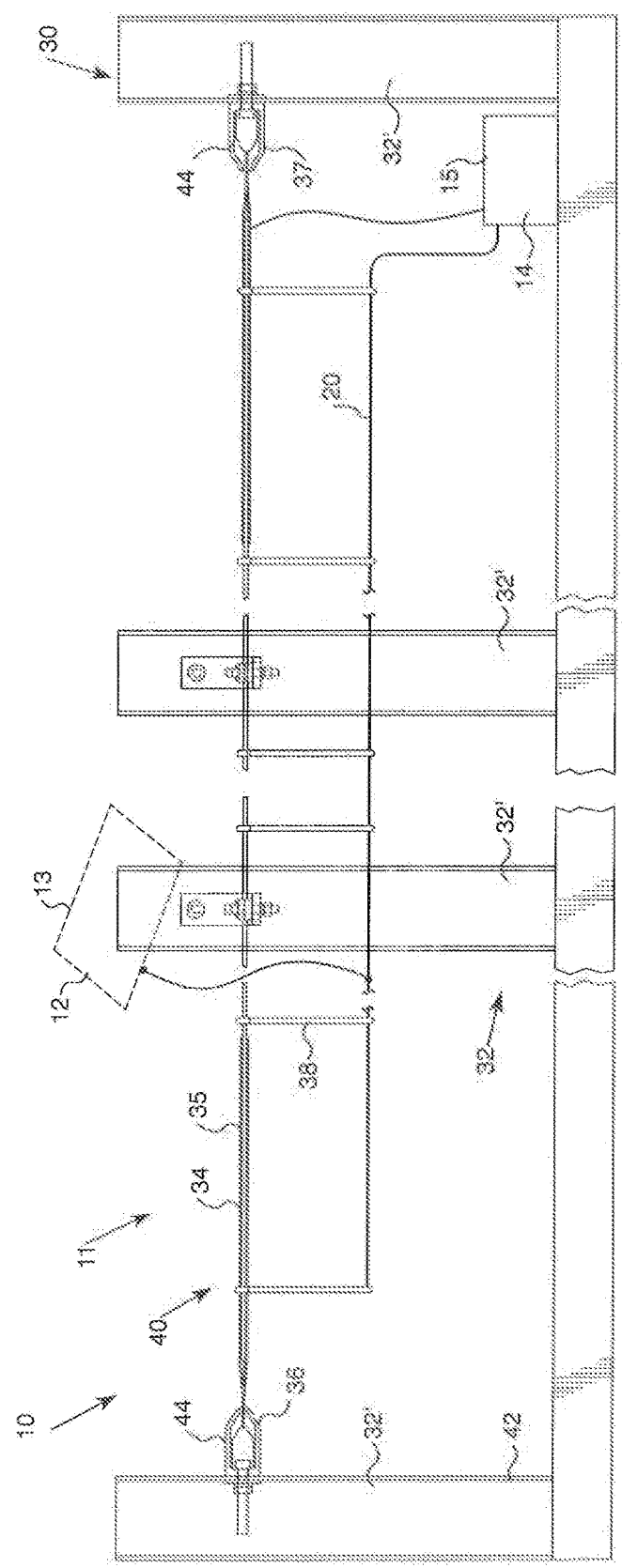
FIG. 1 is a schematic side view of an installation.

As shown in FIGS. 1 and 2, an installation 10 includes a number of source assemblies 12 and a number of receiving assemblies 14 as well as a transmission assembly 16. As used herein, a "source assembly" is an assembly that produces electricity, communication/data signals, or anything that is capable of being transmitted over a wire and/or a conductor. As used herein, a "receiving assembly" is an assembly that receives the electricity, communication/data signals. In an exemplary embodiment, as shown, the installation 10 is a solar power generation facility 11, the source assemblies 12 are solar panels 13, and the receiving assembly 14 (one shown) is a combiner box 15. The transmission assembly 16 is structured to support current wire(s) 20 (as defined above) and data wires (not shown). As shown, the current wire(s) 20 provide a current path from the solar panels 13 to any receiving assembly 14. It is understood that there are also conducting wires (not shown) from another source of electricity, such as, but not limited to a source of A/C current. The A/C current is used to operate devices at the solar panels 13 such as, but not limited to, positioning devices and monitoring devices.

The transmission assembly 16 includes a support assembly 30 and a grounding system 40. In an exemplary embodiment, the support assembly 30 includes number of piles 32, a number of multi-function line assemblies 34, and a number of cable hangers 38. The piles 32 are structured to support the multi-function line assemblies 34 (one shown) at an elevation above the ground. The multi-function line assemblies 34 include a multi-function line 35 and two terminal ends 36, 37. The multi-function line 35 is structured to support the cable hangers 38 which, in turn, support the current wire(s) 20 and the data wires.

Figure 3:
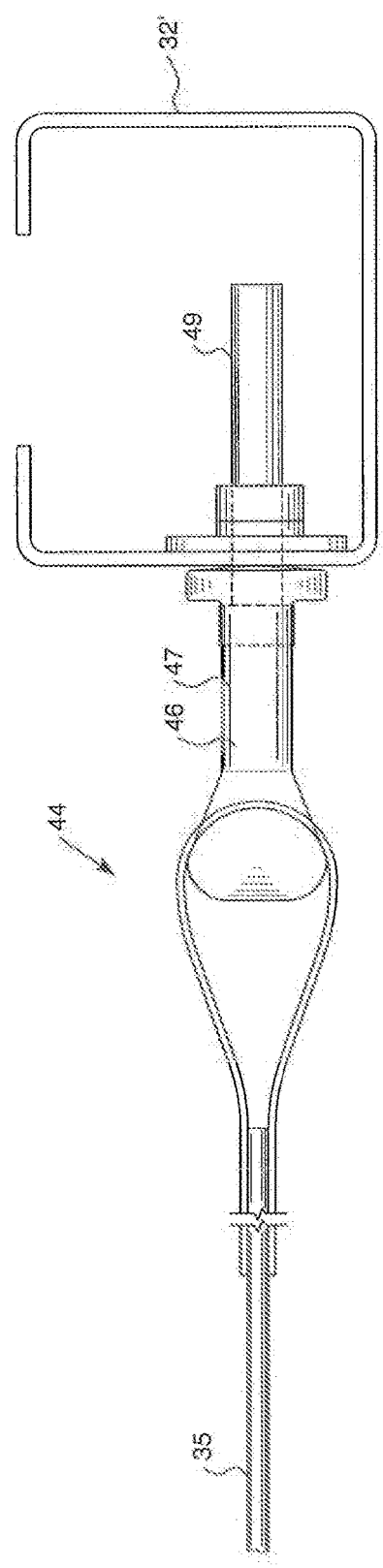
FIG. 3 is a top view of a conductive terminal support.
Figure 4:
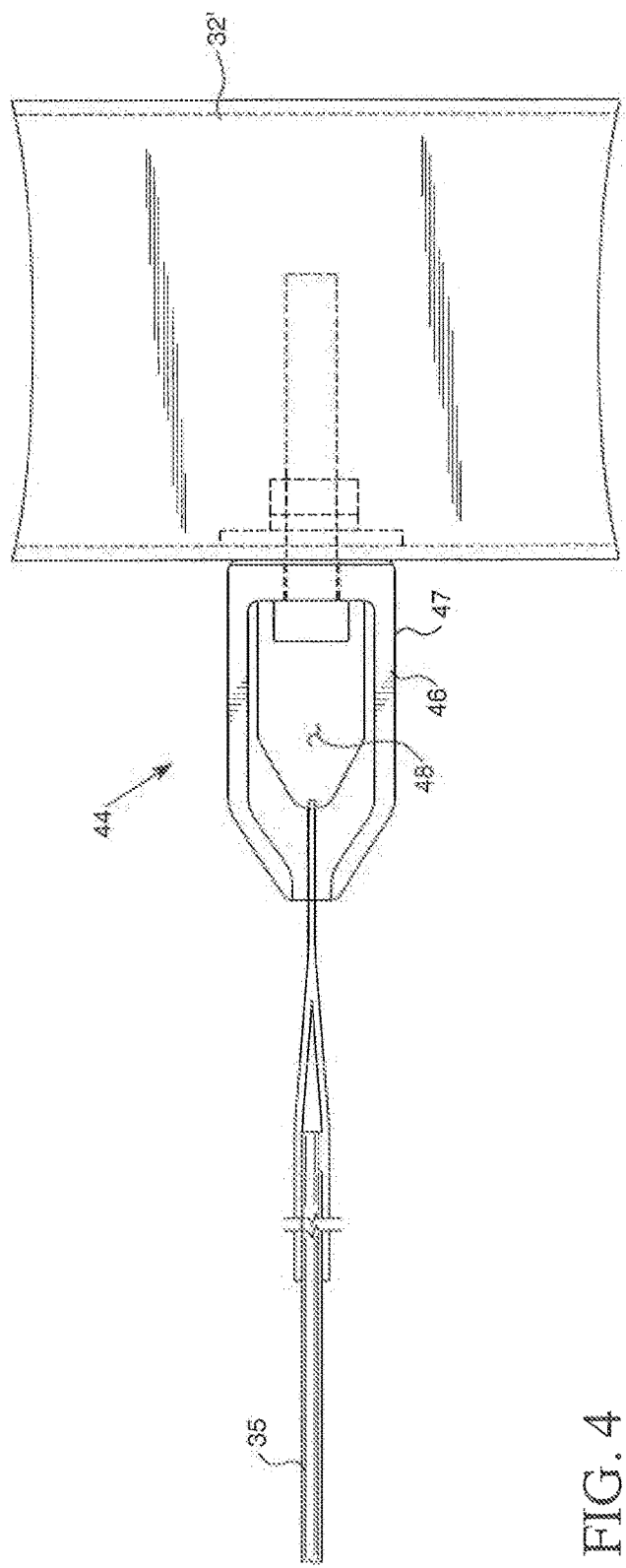
FIG. 4 is a side view of a conductive terminal support.

In one embodiment, as shown in FIGS. 3 and 4, the multi-function line assembly terminal ends 36, 37 include a conductive terminal support 44. As used herein, a "conductive terminal support" 44 is structured to couple a multi-function line 35 to a support, draw the multi-function line 35 taut, and provide a current path between the multi-function line 35 and the support. The support is, for example a conductive pile 32' (discussed below). One embodiment of a multi-function line assembly terminal end 36 includes a thimble eye 46 that includes a body 47 defining an aperture 48 and which includes a threaded base 49. The thimble eye 46 is made from a conductive material. As is known, the multi-function line 35 is passed through the thimble eye body aperture 48 and coupled to itself so as to form a loop. The thimble eye body threaded base 49 is coupled to a conductive pile 32' and drawn tight using a nut (not numbered). In this configuration, the multi-function line 35 and the conductive terminal support 44 are in electrical communication and provide a current path to the conductive pile 32'. That is, the multi-function line 35, the conductive terminal support 44 and the conductive pile 32' define, collectively, a current path and the path between the multi-function line 35 and the conductive terminal support 44 is the exclusive current path between the multi-function line 35 and the conductive pile 32'.

Figure 5:
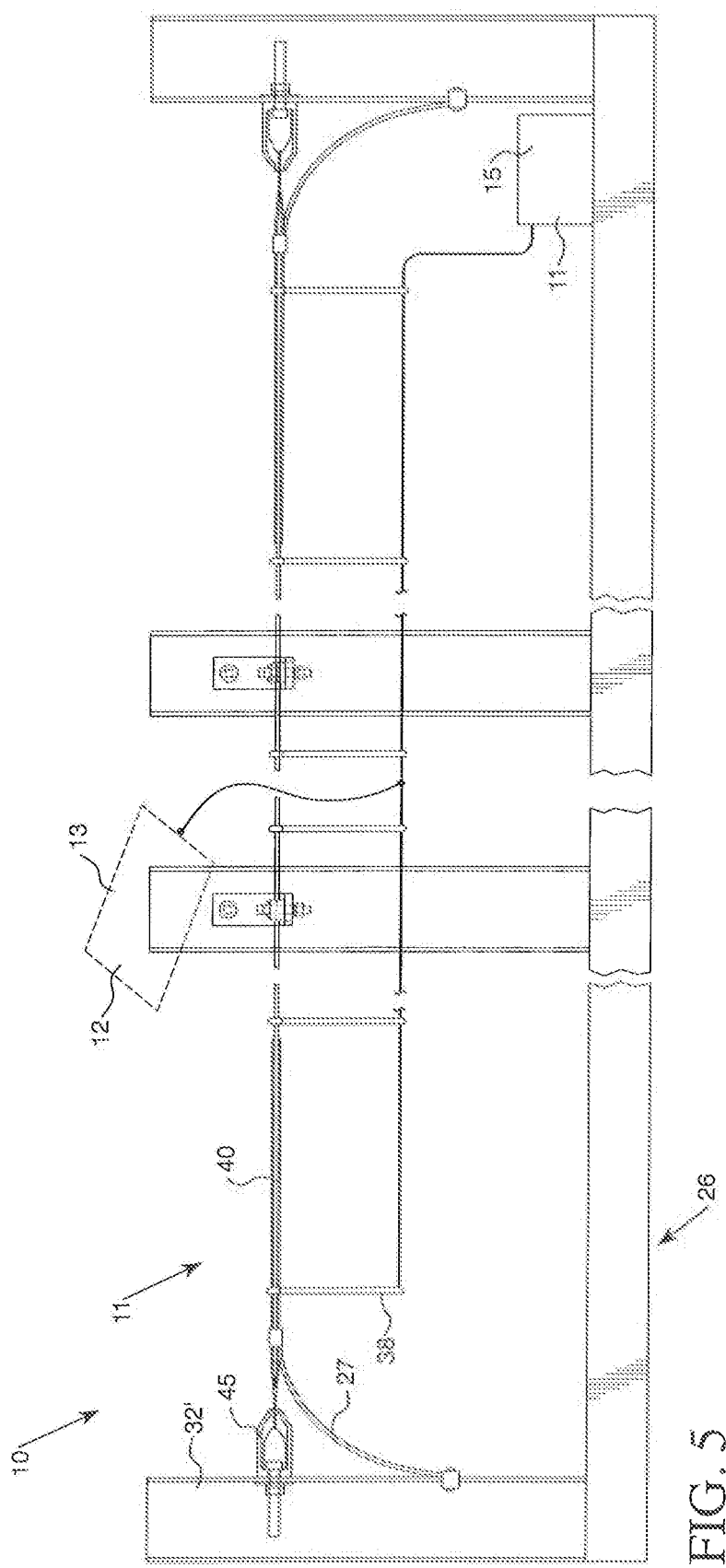
FIG. 5 is a schematic side view of an installation.
Figure 6:
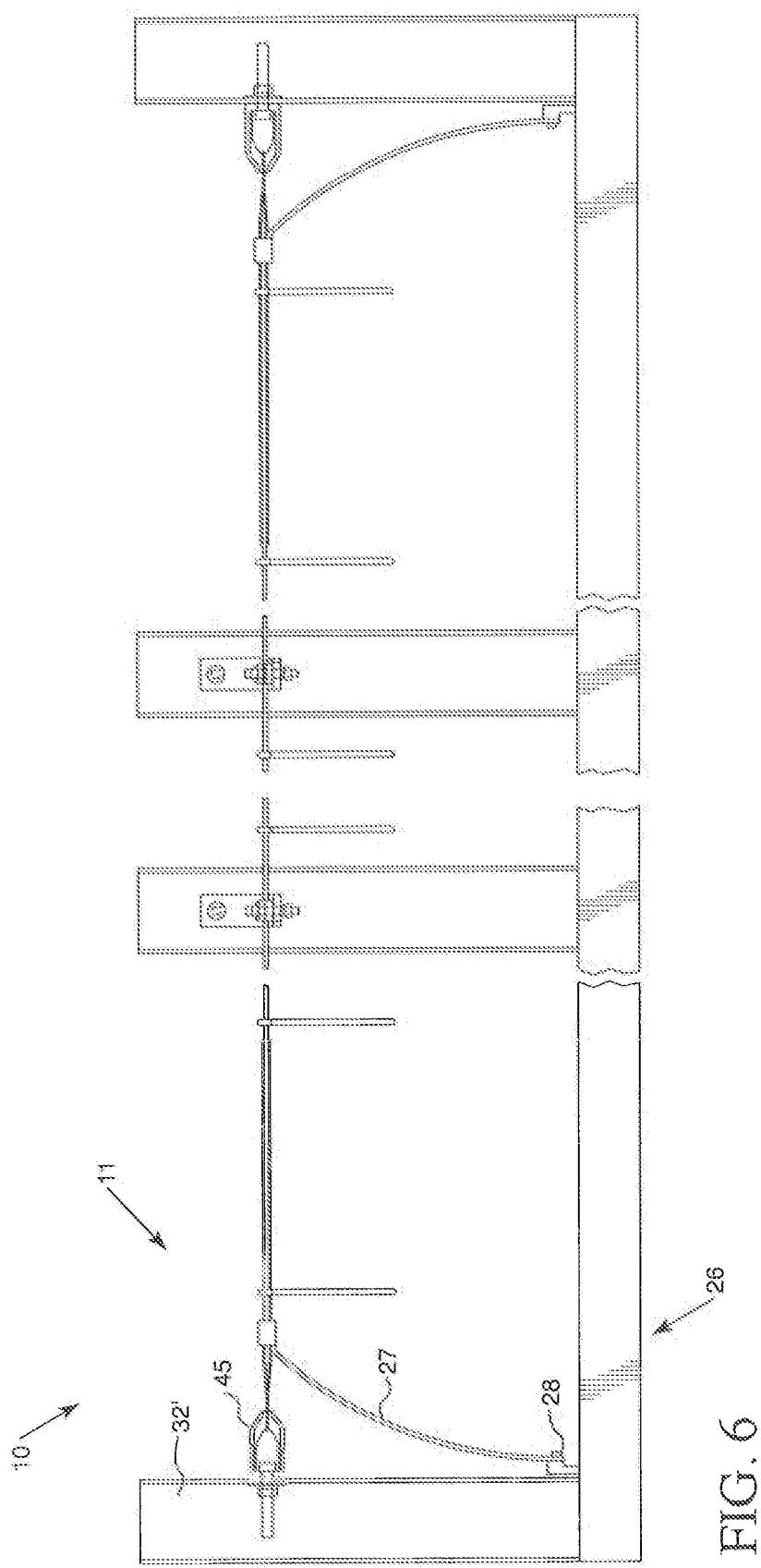
FIG. 6 is a schematic side view of an installation.

In another embodiment, shown in FIGS. 5 and 6, the multi-function line assembly terminal ends 36, 37 include a non-conductive terminal support 45 as well as a grounding assembly 26. In this embodiment, the non-conductive terminal support 45 does not provide, or does not provide an exclusive, current path to the ground. In this embodiment, the grounding assembly 26 provides the path, or the primary path, for a current to the ground. In one embodiment, shown in FIG. 5, the grounding assembly 26 includes a ground wire 27 extending between, and providing electrical communication between, the multi-function line 35 and a conductive pile 32' to which a terminal end 36, 37 is coupled, directly coupled, or fixed. In another embodiment, shown in FIG. 6, the grounding assembly 26 includes a ground wire 27 (as before) as well as a ground rod 28. In an exemplary embodiment, the ground rod 28 is disposed adjacent the conductive pile 32' to which a terminal end 36, 37 is coupled, directly coupled, or fixed. In this embodiment, the ground wire 27 extends between, and provides electrical communication between, the multi-function line 35 and the ground rod 28.

The cable hangers 38, such as but not limited to the cable hangers disclosed in U.S. Pat. No. 9,722,405, are structured to be coupled, directly coupled, temporarily coupled, or fixed to the multi-function line 35. In an exemplary embodiment, the cable hangers 38 are substantially fixed to the multi-function line 35; thus, the cable hangers 38 do not move along the multi-function line 35. The cable hangers 38 include a number of cable support receptacles. For example, in an exemplary embodiment, there is one cable support receptacle for A/C wires, another cable support receptacle for D/C wires, and another receptacle for a data wire. The receptacles are each spaced from one another.

The grounding system 40 is structured to, and does, provide a path to ground for electricity. That is, the grounding system 40 includes conductive elements, or partially conductive elements, as those terms are defined below. The disclosed and claimed grounding system 40 is, unlike the prior art, incorporated into selected elements of the support assembly 30. That is, in an exemplary embodiment, the piles 32 and the multi-function line 35 are conductive elements. As used herein, a "conductive" element includes "highly conductive" sub-elements and/or "partially conductive" sub-elements. As used herein, a "highly conductive" (sub-)element is an element that has minimal resistance to electricity and/or wherein electricity can pass through all portions of the element. For example, a copper wire or a construct made substantially from copper is a "highly conductive" element. As used herein, a "partially conductive" (sub-)element is one that conducts electricity, but with some resistance or wherein electricity does not pass through all portions of the element. For example, galvanized steel or a steel wire with copper cladding are examples of a "partially conductive" element.

Thus, in an exemplary embodiment, the grounding system 40 includes conductive piles 32'. That is, the conductive piles 32' are structured to, and do, conduct electricity. As the conductive piles 32' are disposed in the ground, the conductive piles 32' are in electrical communication with the ground, i.e., the conductive piles 32' are grounded. In one exemplary embodiment, not shown, the conductive piles 32' include a generally non-conductive body, e.g., wood or composite bodies, with a highly conductive element, e.g., a copper wire, or a partially conductive element, i.e., a steel cable, coupled, directly coupled, temporarily coupled, or fixed thereto. In the embodiment shown, the conductive piles 32' include a partially conductive body 42 such as, but not limited to, a galvanized steel C-beam or galvanized steel I-beam.

Further, the multi-function line 35 is conductive, as noted above. Thus, the multi-function line 35 is also part of the grounding system 40 as well as the support assembly 30. As used herein, a multi-function line 35 includes highly conductive elements and/or partially conductive elements. That is, as part of the disclosed and claimed concept, the multi-function line 35 is structured to conduct electricity when needed but not in the normal course of use. As noted above, one non-limiting example of when a multi-function line 35 is needed to conduct electricity includes an instance when the multi-function line 35, or some element coupled thereto, is struck by lightning or wherein a fault/short occurs in current wire(s) 20. Such an instance is uncontrollable and, as such, is not in the normal course of use.

Figure 7:
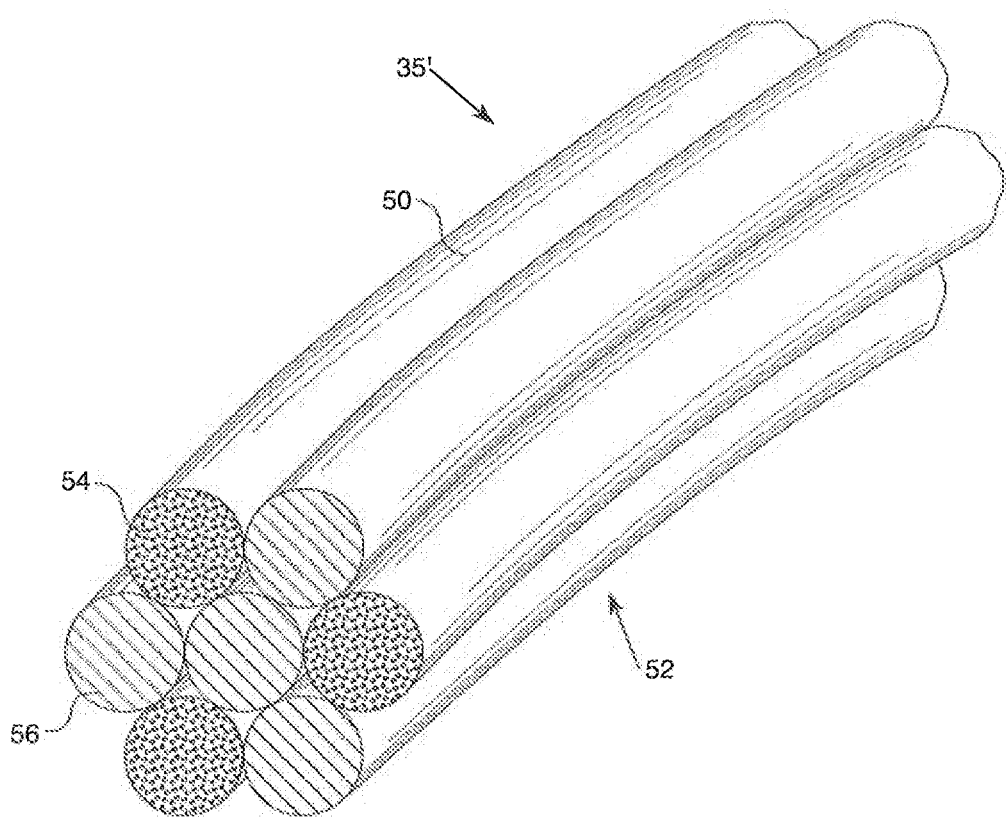
FIG. 7 is an isometric, cross-sectional view of a multi-function line with a partially conductive body.

The multi-function line 35 includes one of a highly conductive body or a partially conductive body 50. That is, in one embodiment, the multi-function line 35 body is a copper wire or a copper cable, i.e., copper wires twisted together or about a copper core. Such a highly multi-function line 35, however, has a lower strength when compared to a steel multi-function line 35. Thus, in an exemplary embodiment, the multi-function line 35 includes a partially conductive body 50. For example, a partially conductive body 50 includes both copper and steel elements. As shown in FIG. 7, in an exemplary embodiment, the partially conductive body 50 is a cable 52 that includes conductive strands 54, (as used herein "strands 54" identifies all conductive strands not otherwise identified by another reference number) such as, but not limited to, copper strands, as well as copper clad steel strands 56. In another embodiment, not shown, the partially conductive body 50 is a cable that includes conductive strands and non-conductive strands. In another embodiment, not shown, the multi-function line 35 is a cable that includes only partially conductive strands such as, but not limited to, copper clad steel strands 56 as described above. Thus, the multi-function line 35 includes strands 54 selected from the group consisting of: copper strands, copper-clad steel strands, galvanized steel strands, a conductive alloy strands, partially conductive, alloy strands, or are a composite of strands. As used herein, a "composite of strands," or alternately "composite strands," means that the strands include only copper strands 54 and copper-clad steel strands 56. Further, a multi-function line 35 made from composite strands is identified herein as a "composite multi-function line" 35. Use of composite strands, or use of a composite multi-function line 35, provides both the conductivity and strength needed to solve the problem(s) noted above. In an exemplary embodiment, the composite multi-function line 35 has only seven strands wherein three strands are copper and four strands are copper-clad steel strands. This configuration of a multi-function line 35, also provides both the conductivity and strength needed to solve the problem(s) noted above.

The grounding system 40 also includes a number of conductive mounting assemblies 60. The conductive mounting assemblies 60 are structured to, and do, couple the multi-function line 35 to the conductive piles 32' and are also structured to, an do, provide a path of electrical communication between the multi-function line 35 to the conductive piles 32'. That is, each conductive mounting assembly 60 is structured to be coupled, directly coupled, temporarily coupled, or fixed to the multi-function line 35 and to a conductive pile 32' and to be in electrical communication with both. When the multi-function line 35 is coupled to a conductive pile 32' by a conductive mounting assembly 60, the multi-function line 35 is in electrical communication with the conductive pile 32'. Thus, any current carried by the multi-function line 35 is coupled to the ground. That is, the grounding system 40 grounds the multi-function line 35 and any element in electrical communication therewith.

In an exemplary embodiment, each conductive mounting assembly 60 includes a mounting body 62, a support coupling 64 and a number of multi-function line couplings 66. Each conductive mounting assembly mounting body 62 (hereinafter, "mounting body") is highly conductive or partially conductive. Further, each mounting body 62 is one of a conductive body 70 or a conductive body assembly (not shown). For example, a conductive body assembly includes a non-conductive element, such as a plastic bracket, as well as a conductive element, such as a copper wire. In the embodiment shown, the mounting body conductive body 70 is galvanized steel. That is, the mounting body conductive body 70 is a partially conductive body.

Figure 8A:
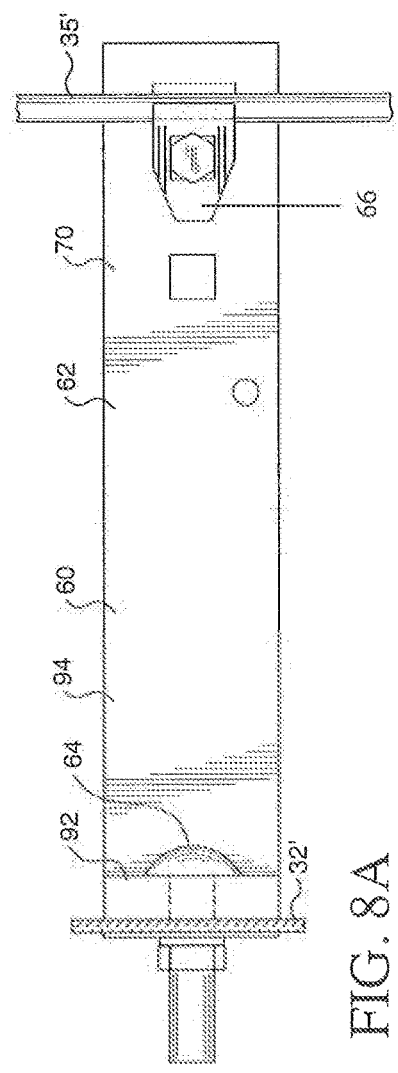
FIG. 8A is a top view of a multi-function line coupling with a clamping assembly.
Figure 8C:
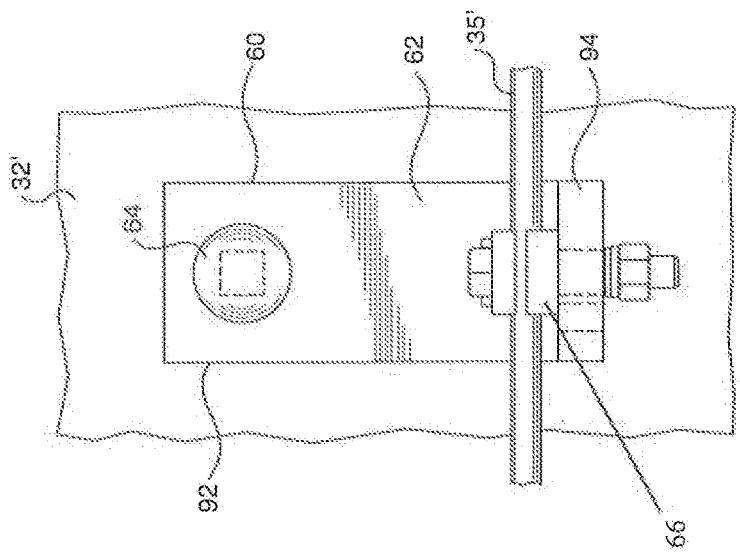
FIG. 8C is a front view of a multi-function line coupling with a clamping assembly.
Figure 8B:
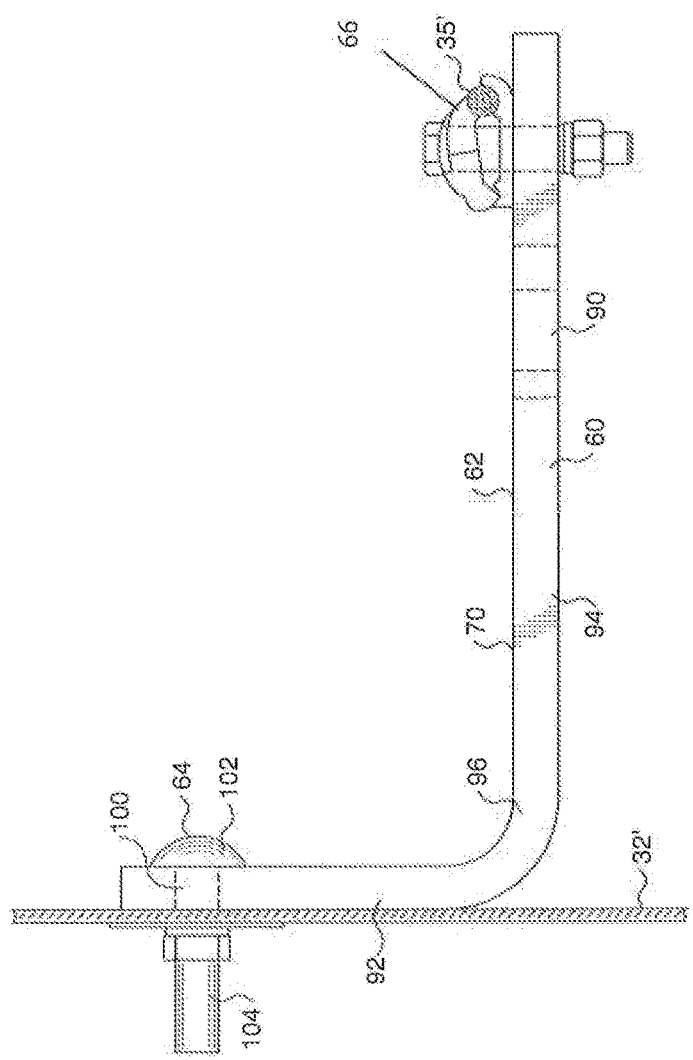
FIG. 8B is a side view of a multi-function line coupling with a clamping assembly.

Further, as shown in FIGS. 8A-8C, in an exemplary embodiment, each mounting body 62 is a simplified shape. As used herein, a "simplified shape" means a body or assembly including generally planar portions and transitional bends or welds between the generally planar portions. As shown, and in an exemplary embodiment, each mounting body 62 is an L-shaped bracket 90. That is, each L-shaped bracket 90 is a unitary body 91 that includes a minor (shorter) planar portion 92 and a major (longer) planar portion 94 with a generally ninety degree transitional bend 96 therebetween. An example of a non-unitary body with a "simplified shape" (not shown) includes, but is not limited to a T-shaped bracket wherein two generally planar bars are welded to each other. A mounting body 62 with a simplified shape is inexpensive and solves the problem(s) noted above.

Each conductive mounting assembly support coupling 64 (hereinafter, "support coupling" 64) is structured to, and does, couple, directly couple, temporarily couple, or fix each mounting body 62 to an associated conductive pile 32'. When a conductive mounting body 62 is coupled to a conductive pile 32' the two elements are in electrical communication. Thus, each mounting body 62 is grounded via the associated conductive pile 32'. In an exemplary embodiment wherein each mounting body 62 is an L-shaped bracket 90, the minor planar portion 92 is coupled, directly coupled, temporarily coupled, or fixed to the associated conductive pile 32'. That is, the support coupling 64 includes a number of openings 100 in the minor planar portion 92 as well as a coupling assembly such as, but not limited to a bolt 102 and nut 104. The support coupling 64 also includes openings (not shown) in the associated conductive pile 32' through which the bolt 102 extends. In an exemplary embodiment, the elements of the support coupling 64 are conductive. That is, for example, the bolt 102 and nut 104 are made from highly conductive and/or partially conductive materials. In another embodiment, the minor planar portion 92 is directly coupled or temporarily, directly coupled to the associated conductive pile 32'.

Each conductive mounting assembly multi-function line coupling 66 (hereinafter, "multi-function line coupling" 66) defines a conductive path. In an exemplary embodiment, each multi-function line coupling 66 is highly conductive. Further, in an exemplary embodiment, each multi-function line coupling 66 is structured to, and does, couple, directly couple, temporarily couple, or fix the multi-function line 35 to the mounting body 62. Thus, the multi-function line coupling 66 provides electrical communication between the multi-function line 35 and the mounting body 62. As the mounting body 62 is grounded, as described above, the multi-function line 35 is also grounded.

Figure 9C:
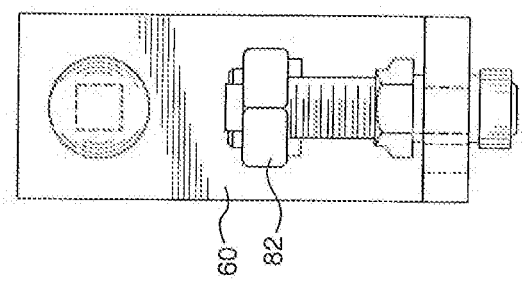
FIG. 9C is a front view of a multi-function line coupling with a split bolt.
Figure 9A:
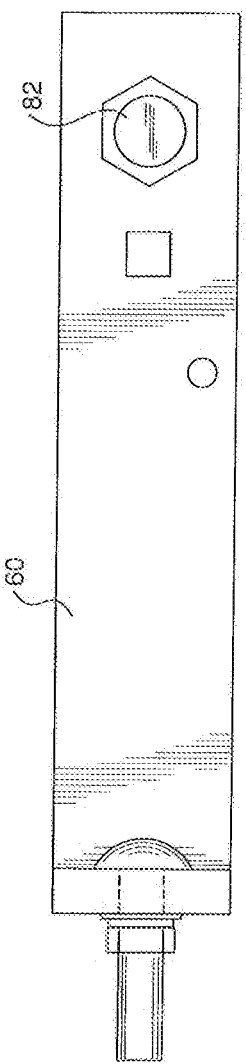
FIG. 9A is a top view of a multi-function line coupling with a split bolt.
Figure 9B:
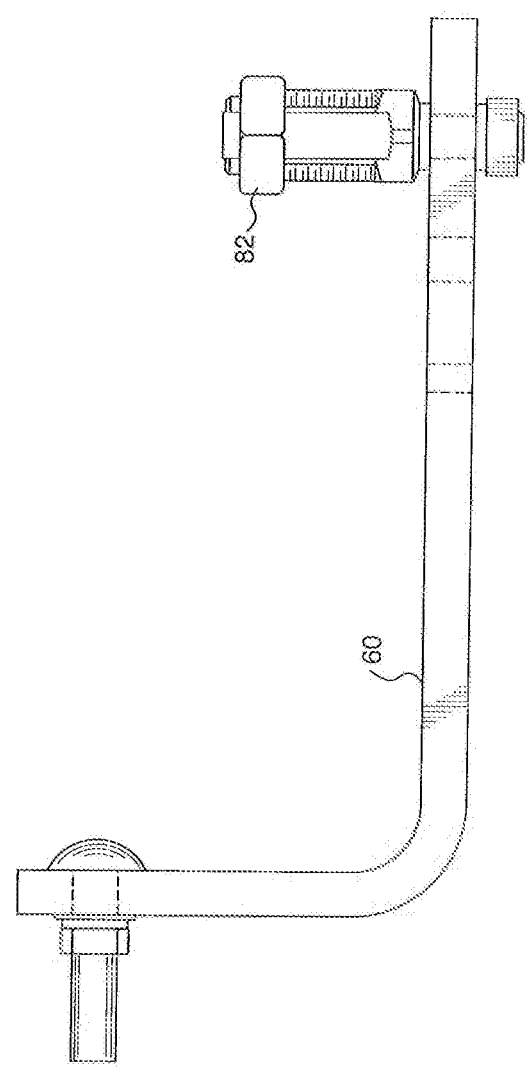
FIG. 9B is a side view of a multi-function line coupling with a split bolt.
Figure 10C:
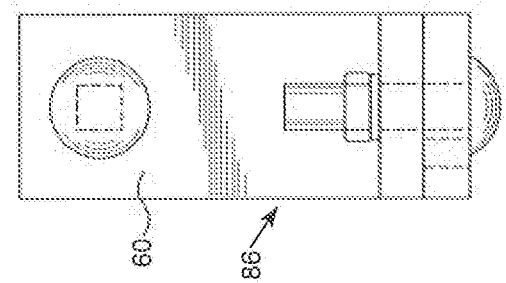
FIG. 10C is a front view of a multi-function line coupling with a double bolt and retaining plate.
Figure 10A:
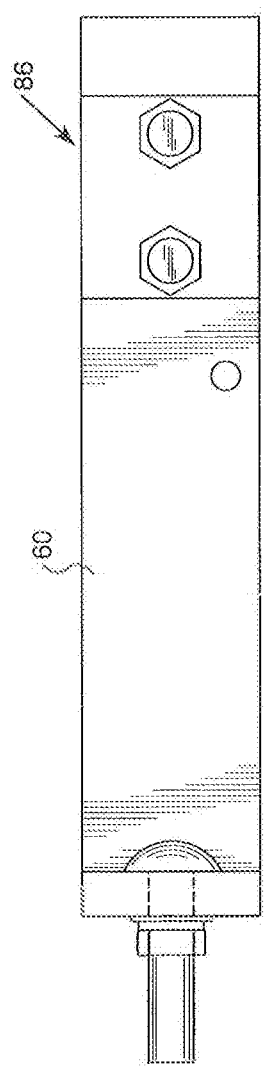
FIG. 10A is a top view of a multi-function line coupling with a double bolt and retaining plate.
Figure 10B:
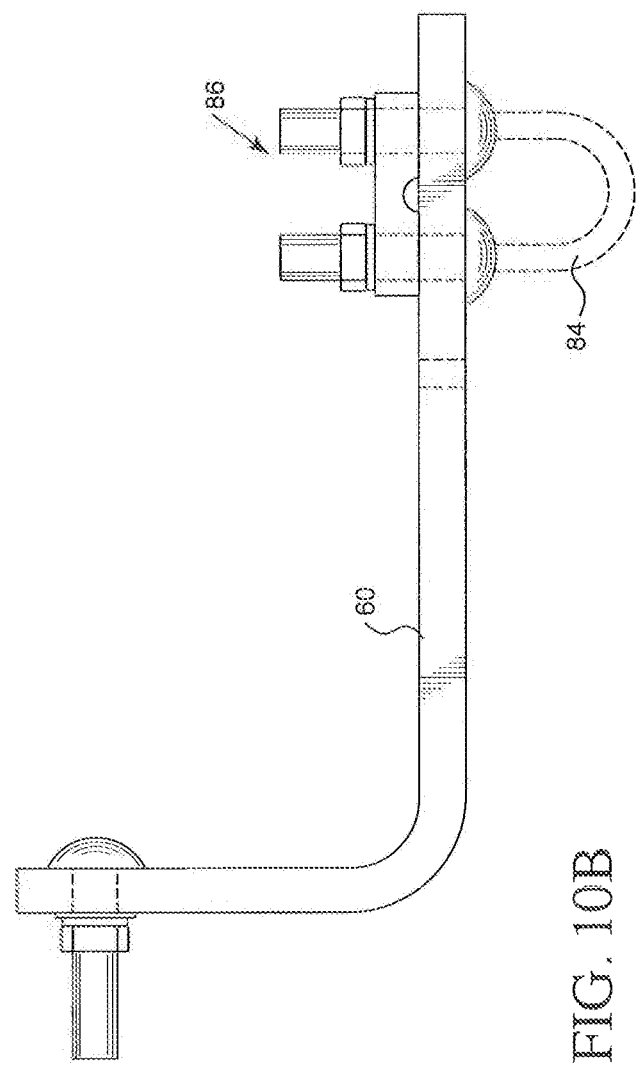
FIG. 10B is a side view of a multi-function line coupling with a double bolt and retaining plate.
Figure 11C:
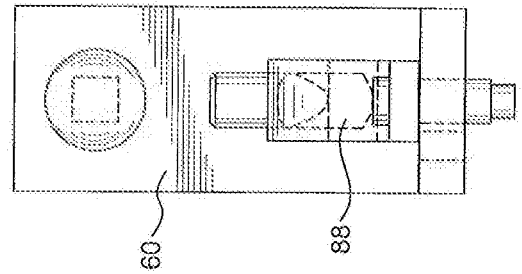
FIG. 11C is a front view of a multi-function line coupling with a lay-in lug assembly.
Figure 11A:
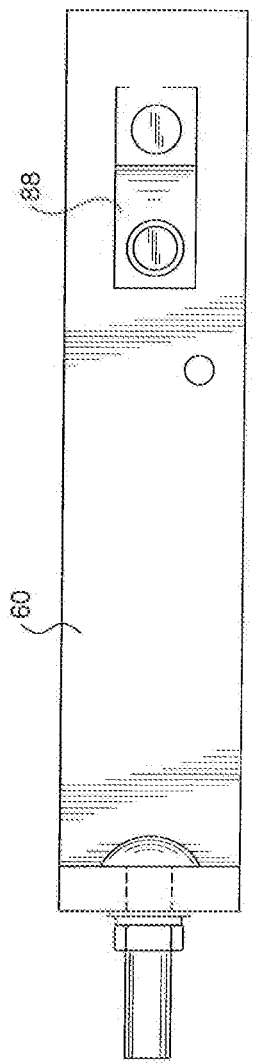
FIG. 11A is a top view of a multi-function line coupling with a lay-in lug assembly.
Figure 11B:
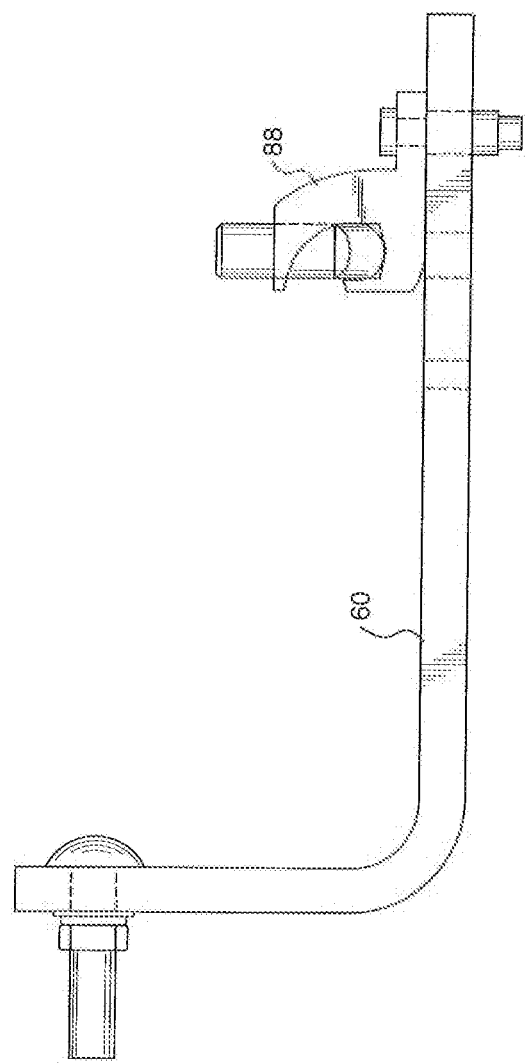
FIG. 11B is a side view of a multi-function line coupling with a lay-in lug assembly.

In one exemplary embodiment, each multi-function line coupling 66 engages, i.e., applies a bias or "clamps," the multi-function line 35. In this embodiment, the multi-function line coupling 66 includes one of a clamping assembly 80 (FIGS. 8A-8C), a split bolt 82 (FIG. 9A-9C), a U-bolt 84 (FIG. 10B, in ghost), a double bolt and retaining plate assembly 86 (FIGS. 10A-10C), or a lay-in lug assembly 88 (FIGS. 11A-11C. As used herein, a "clamping assembly" includes two elements acting in concert, i.e., together, as well as a bias device such as, but not limited to, a spring or a threaded rod. For example, the "two elements acting in concert" include two elements that are pivotally coupled to each other. In this embodiment, the bias device biases the pivotally coupled elements together. As used herein, a "split bolt" includes a threaded rod including a passage and a threaded passage, passage, and/or a nut. As is known, and as shown in FIG. 6B, a cable, such as multi-function line 35 is passed through the rod passage and the threaded rod is drawn against the passage by tightening the nut.

Figure 12:
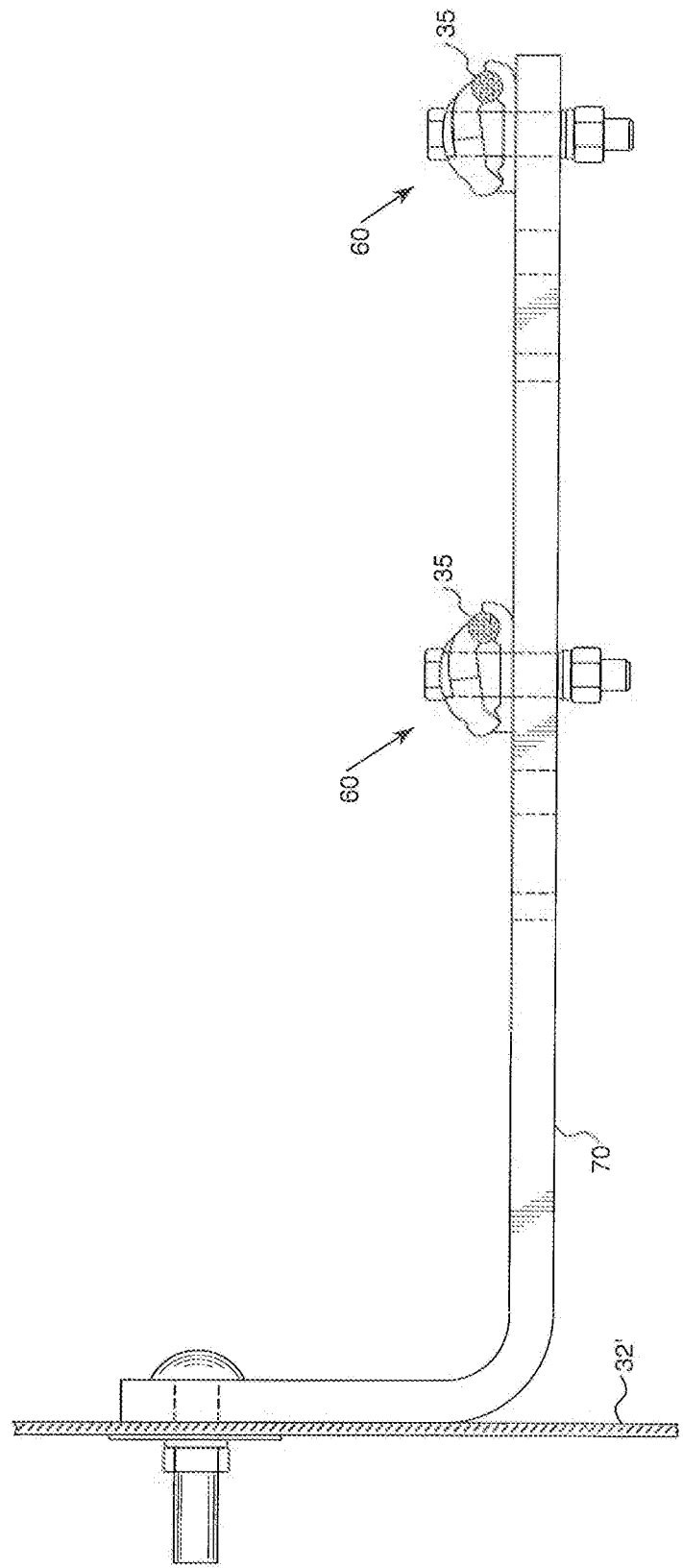
FIG. 12 is a side view of a multi-function line coupling structured to support a plurality of multi-function lines.

In another embodiment, shown in FIG. 12, each conductive mounting assembly 60 is structured to support a plurality of multi-function lines 35. Thus, in this embodiment, there are a plurality of multi-function line couplings 66. Each multi-function line coupling 66 is disposed in one of a "first effective distance," a "second effective distance," or a "third effective distance" from an adjacent multi-function line coupling 66. As used herein, a "first effective distance" means between less than one foot to about one hundred feet apart. As used herein, a "second effective distance" means between one foot and about fifty feet apart. As used herein, a "third effective distance" means between about five feet and about thirty feet apart.

When assembled, the grounding system 40 includes a multi-function line 35 that is coupled, directly coupled, temporarily coupled, or fixed to a multi-function line coupling 66. The multi-function line coupling 66 is coupled, directly coupled, temporarily coupled, or fixed or unitary with the conductive mounting body 62. The conductive mounting body 62 is coupled, directly coupled, temporarily coupled, or fixed to a conductive pile 32' via a conductive support coupling 64. In this configuration, the multi-function line 35 is grounded through the conductive mounting assembly 60 and the conductive pile 32'. Moreover, in one embodiment of such a conductive mounting assembly 60, the multi-function line assembly 34 does not include any grounding splices. In another embodiment of the conductive mounting assembly 60, the multi-function line assembly 34 does not include any medial grounding splices. As used herein, "medial grounding splices" means grounding splices other than at the terminal ends 36, 37 of the multi-function line 35. That is, in a configuration wherein the multi-function line 35 has a grounding splice at only one, or both, of the terminal ends 36, 37, the multi-function line 35 does not include any "medial grounding splices." This solves the problem(s) noted above.

In an exemplary embodiment, grounding system 40 is structured to be operational with solar electrical equipment. That is, in a solar power generation facility 11, there is a well-known configuration of current wire(s) 20 associated with the solar electrical equipment and which communicate a current in a limited range of amperes. As such, to be "structured to be operational with solar electrical equipment," as used herein, means to be structured to support the weight of current wire(s) 20 associated with a solar electrical equipment and to be structured to communicate currents associated with solar electrical equipment.

When installed, the grounding system 40 operates as follows. In an instance where there is a fault in a high voltage wire 20 supported by the cable hangers 38, an arc forms between the fault and the multi-function line 35. The current is then communicated to one of a conductive mounting assembly 60, or, to a conductive terminal support 44 and then to the conductive pile 32'. The conductive pile 32' is in direct electrical communication with the ground. Alternatively, if a grounding assembly 26 is installed, the current passes from the multi-function line 35 through the grounding assembly 26 to the ground. It is understood that the current follows the path of least resistance to the ground. Thus, the current is communicated to the ground. As another example, when lightning strikes the solar panels 13, racking or other equipment, or the multi-function line 35, the current is communicated to a conductive pile 32' via the multi-function line 35 and one of a conductive mounting assembly 60 or a conductive terminal support 44, or, the current passes from the multi-function line 35 to a grounding assembly 26.

Thus, the disclosed grounding system 40 provides a path to ground for a current without including a separate messenger wire and conductor and without grounding splices between a conductor and each pile (or without any medial grounding splices). Further, the multi-function line 35 both supports the cable hangers 38 and current wires 20 while providing a path to ground. This solves the problems stated above.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A transmission assembly structured to support current wire extending between an installation source assembly and an installation receiving assembly, said transmission assembly comprising:
    a number of cable hangers;
    each said cable hanger structured to be coupled to a multi-function line and structured to support a current wire;
    a multi-function line assembly including a multi-function line; and
    said multi-function line coupled to, and in electrical communication with, each said cable hanger.

2. The transmission assembly of claim 1 wherein said multi-function line is structured to be operational with solar electrical equipment.

3. The transmission assembly of claim 1 wherein:
    said multi-function line assembly includes a terminal end; and
    wherein said terminal end is a conductive terminal support.

4. The transmission assembly of claim 1 wherein said multi-function line assembly does not include any medial grounding splices.

5. The transmission assembly of claim 1 wherein said multi-function line includes one of a highly conductive body or a partially conductive body.

6. The transmission assembly of claim 1 wherein said multi-function line includes strands selected from the group consisting of: copper strands, copper-clad steel strands, galvanized strands, conductive alloy strands, partially conductive, alloy strands, or composite strands.

7. The transmission assembly of claim 1 wherein said multi-function line assembly includes three copper strands and four copper-clad steel strands.

8. An installation comprising:
    a source assembly;
    a receiving assembly;
    a current wire extending between said source assembly and said receiving assembly;
    a number of cable hangers;
    each said cable hanger structured to be coupled to a multi-function line and structured to support a current wire;

a multi-function line assembly including a multi-function line;

said current wire coupled to each said cable hanger; and said multi-function line coupled to, and in electrical communication with, each said cable hanger.

9. The installation of claim 8 wherein said multi-function line is structured to be operational with solar electrical equipment.

10. The installation of claim 8 wherein:

said multi-function line assembly includes a terminal end; and wherein said terminal end is a conductive terminal support.

11. The installation of claim 8 wherein said multi-function line assembly does not include any medial grounding splices.

12. The installation of claim 8 wherein said multi-function line includes one of a highly conductive body or a partially conductive body.

13. The installation of claim 8 wherein said multi-function line includes strands selected from the group consisting of: copper strands, copper-clad steel strands, galvanized strands, conductive alloy strands, partially conductive, alloy strands, or composite strands.

* * * * *